US010161631B2

(12) United States Patent
Hokanson

(10) Patent No.: US 10,161,631 B2
(45) Date of Patent: *Dec. 25, 2018

(54) SELF-POWERED DAMPER SYSTEM

(71) Applicant: FIELD CONTROLS, LLC, Kinston, NC (US)

(72) Inventor: Eric A. Hokanson, Kinston, NC (US)

(73) Assignee: Field Controls, LLC, Kinston, NC (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/373,137

(22) Filed: Dec. 8, 2016

(65) Prior Publication Data
US 2017/0089575 A1   Mar. 30, 2017

Related U.S. Application Data

(63) Continuation of application No. 14/091,017, filed on Nov. 26, 2013, now Pat. No. 9,546,786.

(60) Provisional application No. 61/732,012, filed on Nov. 30, 2012.

(51) Int. Cl.
F23L 3/00       (2006.01)
F23L 11/00      (2006.01)
B23P 19/00      (2006.01)

(52) U.S. Cl.
CPC .............. *F23L 11/00* (2013.01); *B23P 19/00* (2013.01); *F23L 3/00* (2013.01); *F23M 2900/13003* (2013.01); *Y10T 29/49826* (2015.01)

(58) Field of Classification Search
CPC .............. F23L 11/00; F23L 3/00; B23P 19/00

USPC .......... 126/285 B, 312, 290, 80; 431/80, 20
See application file for complete search history.

(56) References Cited

U.S. PATENT DOCUMENTS

| | | | |
|---|---|---|---|
| 2,676,257 A * | 4/1954 | Hebenstreit | H01Q 3/22 333/157 |
| 5,881,806 A | 3/1999 | Rudd | |
| D409,073 S | 5/1999 | Bluestone | |
| 5,931,655 A * | 8/1999 | Maher, Jr. | F23N 5/102 236/1 H |
| 6,035,849 A | 3/2000 | Bluestone | |
| 6,053,163 A | 4/2000 | Bass | |
| 6,082,704 A | 7/2000 | Grinbergs | |
| 6,257,871 B1 | 7/2001 | Weiss et al. | |
| 6,409,143 B1 | 6/2002 | Beck et al. | |
| 6,431,268 B1 | 8/2002 | Rudd | |
| 6,439,877 B1 * | 8/2002 | Weiss | F23L 11/00 126/285 B |
| 6,557,501 B2 | 5/2003 | Hughes | |

(Continued)

OTHER PUBLICATIONS

Examiner's Report for Canadian Patent Application No. 2835379 dated Feb. 15, 2015, 6 pgs.

(Continued)

*Primary Examiner* — Gregory Huson
*Assistant Examiner* — Nikhil Mashruwala
(74) *Attorney, Agent, or Firm* — Brinks Gilson & Lione

(57) ABSTRACT

A system for operating a damper comprises a flue pipe assembly, and a damper movable between an open position and a closed position within the flue pipe assembly. At least one thermoelectric generator is coupled to a surface of the flue pipe assembly. Operation of the damper is achieved by the thermoelectric generator harvesting thermal energy from the flue pipe assembly and converting it into usable electrical energy for actuation of the damper.

20 Claims, 1 Drawing Sheet

(56) References Cited

U.S. PATENT DOCUMENTS

| | | |
|---|---|---|
| 6,644,957 B2 | 11/2003 | Weiss |
| 6,745,724 B2 | 6/2004 | Hughes et al. |
| 6,749,124 B2 | 6/2004 | Weiss |
| 6,749,125 B1 | 6/2004 | Carson et al. |
| 6,855,050 B2 | 2/2005 | Gagnon et al. |
| 6,915,799 B2 | 7/2005 | Weiss |
| 7,258,280 B2 | 8/2007 | Wolfson |
| 7,314,370 B2 * | 1/2008 | Chian ............... F23N 1/005 431/24 |
| 7,451,759 B2 | 11/2008 | Weiss et al. |
| 7,721,972 B2 | 5/2010 | Bracken et al. |
| 8,113,823 B2 | 2/2012 | Guzorek |
| 8,297,524 B2 | 10/2012 | Kucera et al. |
| 2006/0275720 A1 * | 12/2006 | Hotton ............... F23N 5/102 431/80 |
| 2013/0048743 A1 | 2/2013 | Kucera et al. |
| 2013/0092148 A1 * | 4/2013 | Parvin ............... F24C 15/20 126/299 D |
| 2016/0047548 A1 * | 2/2016 | Farley ............... F23N 5/242 126/116 A |

OTHER PUBLICATIONS

Response to Examiner's Report for Canadian Patent Application No. 2835379 filed Aug. 12, 2015, 12 pgs.
Notice of Allowance for Canadian Patent Application No. 2835379 dated Oct. 7, 2015, 1 pg.

* cited by examiner

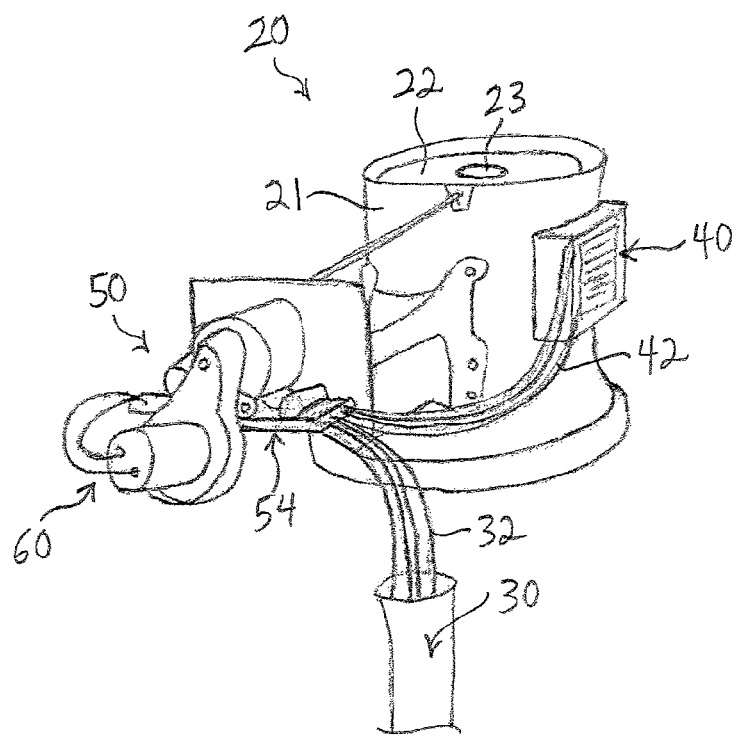

SELF-POWERED DAMPER SYSTEM

PRIORITY CLAIM

The present patent document is a continuation application that claims the benefit of priority under 35 U.S.C. § 120 of U.S. patent application Ser. No. 14/091,017, filed Nov. 26, 2013, which claims the benefit of the filing date under 35 U.S.C. § 119(e) of Provisional U.S. Patent Application Ser. No. 61/732,012, filed Nov. 30, 2012. All of the foregoing applications are hereby incorporated by reference in their entirety.

BACKGROUND

The present invention relates generally to gas-fired appliances, and, more particularly, to a system for operating a damper of a water heater or other gas-fired appliance.

Many gas-fired appliances, such as boilers or water heaters, include burners that fire to raise the temperature of materials, such as water, contained within a tank. In many such appliances, the burners periodically cycle on and off. When the contents of the tank fall below a desired minimum temperature, a call for heat is triggered, which initiates the firing of a main gas burner assembly. The resulting heat generated by the burner acts to raise the tank temperature. When the tank temperature reaches a desired maximum threshold, the main burner is deactivated, until such time as the tank cools and again falls below the minimum desired temperature. A small pilot burner can be provided to maintain a small flame under normal operation, which flame is used to ignite the main burner when desired.

To increase the energy efficiency of such gas-fired appliances, many systems include one or more dampers. For example, a flue damper can be provided within an exhaust flue near the top of a gas fired appliance. The flue damper is opened during operation of the main burner, to permit the venting of heat and exhaust gases generated during operation of the main burner; however, once the main burner is shut off, the flue damper closes the flue, thereby reducing heat loss out the flue and retaining heat within the appliance to improve the overall energy efficiency of the appliance.

Conventionally, dampers can be operated using an electric motor supplied by 24 volt or 120 volt power sources. However, such designs typically require the routing of a power source to the location of the gas-fired appliance, potentially increasing installation costs. More recently, gas-fired appliances have been designed using devices such as one or more 750 millivolt thermopiles, operating using heat from the pilot flame, to power a low-power motor. The low-power motor in turn operates the flue damper.

However, many gas-fired appliances, particularly residential water heaters, do not include power sources having sufficient voltage to reliably operate a damper motor. As a result, many residential water heaters are primarily mechanically operated. While some such water heaters may utilize a thermocouple to operate a magnetic pilot safety switch, such thermocouples typically generate only 10 to 30 millivolts, and do not supply sufficient power to drive a damper motor. Because of such control limitations, flue dampers are often not provided on residential water heaters, thereby sacrificing potential improvements in energy efficiency.

SUMMARY

A system for operating a damper comprises a flue pipe assembly, and a damper movable between an open position and a closed position within the flue pipe assembly. At least one thermoelectric generator is coupled to a surface of the flue pipe assembly. Operation of the damper is achieved by the thermoelectric generator harvesting thermal energy from the flue pipe assembly and converting it into usable electrical energy for actuation of the damper.

The system may comprise a motor, wherein the damper is coupled to the motor and is movable between the open position and the closed position in response to operation of the motor. The thermoelectric generator may be coupled to the motor by at least one power lead. In one embodiment, the thermoelectric generator is mounted to an exterior surface of the flue pipe assembly.

The system may further comprise a thermopile that is coupled to a gas valve and also the damper. The damper can be disconnected from the thermopile and remain self-sustaining while a pilot or main burner is active. A damper control may utilize energy supplied by the thermopile until the thermoelectric generator has reached an operating point that sustains full operation of the damper. When the thermoelectric generator reaches a functional operating point, the damper may automatically disconnect from the thermopile.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a schematic diagram illustrating an embodiment of the apparatus of the present invention.

DETAILED DESCRIPTION OF THE PREFERRED EMBODIMENTS

Referring to FIG. 1, a schematic diagram illustrating an embodiment of the apparatus 20 of the present invention is shown and described. The apparatus 20 may be used as a portion of a gas-fired appliance, such as a water heater. The gas-fired appliance may receive combustible gas, such as natural gas, via a supply line. Gas is fed through a pilot valve, which supplies gas to a pilot burner. A thermopile 30 may be positioned adjacent the pilot burner to generate voltage when exposed to the heat of the pilot flame. If the pilot flame is extinguished, the thermopile 30 may cease to generate sufficient voltage for a pilot valve magnet to maintain the pilot valve in an open position, thereby stopping the flow of gas to the pilot burner.

In an embodiment in which the gas-fired appliance is a water heater, a temperature sensor can be provided within the water tank, such that a call for heat is issued when the water temperature falls below a desired level. In response to a call for heat, a burner valve is opened, thereby supplying gas to a main burner. The damper 22 may be moved between open and closed positions based on certain operating parameters.

For example, an open position of the damper 22 may be provided so that exhaust is vented while the main burner is ignited, and when continued activation of the main burner is no longer required then the damper 22 may move into a closed position to reduce heat loss from the appliance. Further background details of systems that utilize a damper movable between an open position and a closed position within a flue pipe assembly are described in U.S. Patent Publication 2009/0191493, as well as U.S. Patent Publication 2012/0282557, each of which are hereby incorporated by reference in their entirety.

In the present embodiment, the damper 22 can be disconnected from the thermopile 30 and remain self-sustaining while a pilot or main burner is active. The self-powered system comprises a thermoelectric generator 40, such that step-up DC to DC conversion is not required to operate a DC motor, integrated microprocessor, and other analog or digital devices that operate above about 700 mV.

One particular goal of the present embodiments is for the damper 22 to harvest electrical energy from a flue pipe assembly 21 of the boiler/water heater, without loading the thermopile 30 that is used to power the gas valve.

While the pilot flame and the main burner flame will generate thermal energy that will be otherwise lost as exhaust, the present embodiments harvest this thermal energy and convert it into usable electrical energy at a suitable voltage potential. The typical output generated by a thermoelectric generator is in the range of about 1.8 to about 5.0 volts, which is suitable for operation of integrated circuits or devices, such as transistors, diodes, microcontrollers, logic chips, and the like. Therefore, thermal energy that is converted into electrical energy by the thermoelectric generator 40 mounted to the flue pipe assembly 21 will allow a damper control 50, coupled to a motor 60 for actuating the damper 22, to be self-powered by recovering usable energy from hot flue gases of a boiler/water heater appliance that would otherwise be lost as wasted energy flue exhaust.

In the example of FIG. 1, the thermoelectric generator 40 may be mounted to the flue pipe assembly 21 of the damper 22 in a single module or a series of modules, which may form a partial or complete ring around a perimeter of the flue pipe assembly 21. In the non-limiting embodiment depicted in FIG. 1, the thermoelectric generator 40 is disposed primarily on one side of an outer surface of the flue pipe assembly 21.

In use, thermal energy that is typically lost in the exhaust flue will be transferred through the metal flue pipe assembly 21 of the damper 22 and to the thermoelectric generator 40. The thermal energy is converted into usable electrical energy that can be stored and consumed by the damper control 50. Thermoelectric power leads 42 may be provided for the harvested energy transfer, as depicted in FIG. 1.

Advantageously, the harvested electrical energy may be used to power the damper control 50 and to disconnect the damper 22 from the thermopile 30 of the boiler/water heater. An automatic disconnect from the thermopile 30, which is an energy source for the gas valve, will prevent loss of function of the damper control 50 when the main burner is fired, during which the pilot flame pulls away from the thermopile 30 resulting in reduced output power. There is a disconnect from thermopile power leads 32, disposed between the thermopile 30 and the damper control 50, which may comprise end switch connections or serial communication cables. During start up, the damper system will utilize energy supplied by the thermopile 30 until the thermoelectric generator 40 has reached an operating point that sustains full operation of the damper 22. When the thermoelectric generator 40 reaches the operating point, the damper 22 will automatically disconnect from the thermopile 30, which will reserve more energy to the gas valve. A self-powered damper system will be able to maintain full operation of the motor 60 that actuates the damper 22, without causing the gas valve to drop out due to loading on the thermopile 30.

As a further advantage, in the present embodiments, the temperature differential between the flue pipe 21 and ambient air temperature is relatively stable, and therefore thermal energy of the heated flue gases can be recovered into usable electrical energy. Further, the self-powered damper system automatically disconnects from the thermopile 30, which allows more energy to be available to the gas valve.

A thermal slug may be coupled to the thermoelectric generator 40, and a heat sink may be used to increase the thermal differential of the thermoelectric generator 40. Further, it is possible for the heat sink to be connected to a cold water pipe to act as a coolant.

The apparatus 20 is expected to reduce problems with operating the motor 60, which may be a 400 mV rated motor, after the main burner has turned off. The power output of the thermopile 30 used with the boiler/water heater will take time to recover from thermal saturation due to heat generated by the main burner, or lack of sufficient pilot flame contact. When the thermopile 30 is loaded by the gas valve and the damper control 50, energy recovery time of the thermopile 30 is increased by the additional load required to close the damper 22, which may result in pilot flame drop out.

Circuitry 54 may be provided to operate the motor 60. Other electronics may be provided to power an integrated microprocessor based damper control. The thermopile leads 32 and the thermoelectric generator leads 42 may be coupled to power the microprocessor and related circuitry 54, as depicted in FIG. 1. The damper control 50 may operate from power received from the thermopile 30 until the thermoelectric generator 40 reaches a suitable operating state, at which time thermal energy of the flue pipe assembly 21 is converted into electrical energy by the thermoelectric generator 40 with automatic changeover of the power source. Notably, if the thermoelectric generator 40 fails to reach or sustain power conditions suitable for operating the damper 22, then the thermopile 30 will be reconnected automatically as the power source for the damper 22.

The damper 22 is movable between an open position and a closed position. A vent hole 23 may be provided as part of the damper 22, as depicted in FIG. 1. The damper 22 is coupled to the motor 60, and is movable between the open position and the closed position in response to operation of the motor 60. One or more linkages may be provided to effect motion of the damper 22 based on operation of the motor 60.

In lieu of the power harvesting achieved by the provision of a thermoelectric generator 40 coupled to the flue pipe assembly 21, power harvesting may be achieved by converting mechanical energy, including but not limited to vibrations and fluid flow, and/or light energy to achieve the functionality provided by the thermoelectric generator 40, and the various advantages described above.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

I claim:

1. A system for operating a damper, the system comprising:
   a flue pipe assembly;
   a damper movable between an open position and a closed position within the flue pipe assembly;
   at least one thermoelectric generator, wherein operation of the damper is achieved by the thermoelectric generator harvesting thermal energy and converting it into usable electrical energy for actuation of the damper; and
   a thermopile that is coupled to power a gas valve and also the damper, where the damper is selectively disconnected from the thermopile and remains self-sustaining while a pilot or main burner is active.

2. The system of claim 1 further comprising a motor, wherein the damper is coupled to the motor and is movable between the open position and the closed position in response to operation of the motor.

3. The system of claim 2, wherein the thermoelectric generator is coupled to the motor by at least one power lead.

4. The system of claim 1, wherein the at least one thermoelectric generator is coupled to a surface of the flue pipe assembly and harvests thermal energy from the flue pipe assembly.

5. The system of claim 1, wherein a damper control utilizes energy supplied by the thermopile until the thermoelectric generator has reached an operating point that sustains full operation of the damper.

6. The system of claim 5, wherein when the thermoelectric generator reaches a functional operating point, the damper will automatically disconnect from the thermopile.

7. The system of claim 1, wherein the thermoelectric generator is mounted to an exterior surface of the flue pipe assembly.

8. A method for operating a damper, the method comprising:
   providing a flue pipe assembly and a damper movable between an open position and a closed position within the flue pipe assembly;
   achieving operation of the damper by at least one thermoelectric generator harvesting thermal energy and converting it into usable electrical energy for actuation of the damper; and
   coupling a thermopile to power a gas valve and also the damper, where the damper is selectively disconnected from the thermopile and remains self-sustaining while a pilot or main burner is active.

9. The method of claim 8 further comprising coupling the damper to a motor and moving the damper between the open position and the closed position in response to operation of the motor.

10. The method of claim 9 further comprising coupling the thermoelectric generator to the motor by at least one power lead.

11. The system of claim 8, further comprising coupling the at least one thermoelectric generator to a surface of the flue pipe assembly and harvesting thermal energy from the flue pipe assembly.

12. The method of claim 8, wherein a damper control utilizes energy supplied by the thermopile until the thermoelectric generator has reached an operating point that sustains full operation of the damper.

13. The method of claim 12 further comprising automatically disconnecting the damper from the thermopile when the thermoelectric generator reaches a functional operating point.

14. The method of claim 8, wherein the thermoelectric generator is mounted to an exterior surface of the flue pipe assembly.

15. A system for operating a damper, the system comprising:
   a flue pipe assembly;
   a damper movable between an open position and a closed position within the flue pipe assembly;
   at least one thermoelectric generator; and
   a thermopile that is coupled to power a gas valve and also the damper, where the damper is selectively disconnected from the thermopile and remains self-sustaining while a pilot or main burner is active.

16. The system of claim 15, wherein operation of the damper is achieved by the at least one thermoelectric generator harvesting thermal energy from the flue pipe assembly and converting it into usable electrical energy for actuation of the damper.

17. The system of claim 16, wherein the at least one thermoelectric generator is mounted to an exterior surface of the flue pipe assembly.

18. The system of claim 15 further comprising a motor, wherein the damper is coupled to the motor and is movable between the open position and the closed position in response to operation of the motor.

19. The system of claim 15, wherein a damper control utilizes energy supplied by the thermopile until the thermoelectric generator has reached an operating point that sustains full operation of the damper.

20. The system of claim 19, wherein when the thermoelectric generator reaches a functional operating point, the damper will automatically disconnect from the thermopile.

* * * * *